US012686118B2

(12) United States Patent
Mambretti et al.

(10) Patent No.: US 12,686,118 B2
(45) Date of Patent: Jul. 21, 2026

(54) TECHNIQUES FOR CONTROLLING MOVEMENT OF A MACHINE

(71) Applicant: Augmenta Inc., Toronto (CA)

(72) Inventors: Lorenzo Mambretti, Kitchener (CA); Francesco Iorio, Toronto (CA); Massimiliano Moruzzi, Rockford, IL (US)

(73) Assignee: XABA INC., Toronto (CA)

( * ) Notice: Subject to any disclaimer, the term of this patent is extended or adjusted under 35 U.S.C. 154(b) by 212 days.

(21) Appl. No.: 18/315,413

(22) Filed: May 10, 2023

(65) Prior Publication Data

US 2023/0364781 A1 Nov. 16, 2023

Related U.S. Application Data

(60) Provisional application No. 63/341,985, filed on May 13, 2022.

(51) Int. Cl.
*B25J 9/16* (2006.01)
*B25J 19/02* (2006.01)
*B25J 13/08* (2006.01)

(52) U.S. Cl.
CPC ............. *B25J 9/1605* (2013.01); *B25J 9/163* (2013.01); *B25J 9/1664* (2013.01); *B25J 19/022* (2013.01); *B25J 13/089* (2013.01)

(58) Field of Classification Search
CPC ........ B25J 9/1605; B25J 9/163; B25J 9/1664; B25J 19/022; B25J 13/089; B25J 9/1692
See application file for complete search history.

(56) References Cited

U.S. PATENT DOCUMENTS

| | | |
|---|---|---|
| 2019/0084151 A1 | 3/2019 | Bai et al. |
| 2021/0053230 A1 | 2/2021 | Mizoguchi et al. |
| 2021/0078167 A1* | 3/2021 | Khansari Zadeh .. B25J 15/0028 |
| 2021/0114206 A1* | 4/2021 | Haley .................... B25J 9/1605 |
| 2021/0129339 A1 | 5/2021 | Pipe-Mazo et al. |
| 2021/0138656 A1* | 5/2021 | Gothoskar ............. G06V 20/10 |
| 2021/0178590 A1 | 6/2021 | Mao et al. |
| 2022/0142712 A1 | 5/2022 | Toporek et al. |
| 2023/0186609 A1 | 6/2023 | Pauwels et al. |
| 2024/0054393 A1 | 2/2024 | Tanaka et al. |

(Continued)

OTHER PUBLICATIONS

International Search Report for Application No. PCT/US2023/022125 dated Sep. 6, 2023.

(Continued)

*Primary Examiner* — Dylan M Katz
(74) *Attorney, Agent, or Firm* — Artegis Law Group, LLP

(57) ABSTRACT

A computer-implemented method for controlling a machine includes: determining a first state for the machine based on a kinematics model of the machine and a target roto-translation for an end effector associated with the machine; determining, using a forward-kinematics machine-learning model, a difference between the target roto-translation of the end effector and a first roto-translation of the end effector when the machine is in the first state; based on the difference between the target roto-translation and the first roto-translation, determining a second state for the machine; and outputting a control input for one or more actuators that causes the machine enter into the second state.

20 Claims, 7 Drawing Sheets

(56) References Cited

U.S. PATENT DOCUMENTS

2024/0383144 A1* 11/2024 Kamedula ............. B25J 9/1607

OTHER PUBLICATIONS

Zhong, Xiaolin, "Robot Calibration Using Artificial Neural Networks", Department of Mechanical, Manufacturing and Software Engineering, Nov. 1995, pp. 1-184.

Siciliano et al., "Robotics—Chapters 2-4", Springer, Dec. 31, 2009, pp. 39-189.

Theofanidis et al., "Kinematic Estimation with Neural Networks for Robotic Manipulators", 18th International Conference, https://doi.org/10.1007/978-3-030-01424-7_77, 2018, pp. 795-802.

Non Final Office Action received for U.S. Appl. No. 18/315,430 dated Mar. 18, 2025, 42 pages.

Final Office Action received for U.S. Appl. No. 18/315,430 dated Jul. 2, 2025, 42 pages.

Notice of Allowance received for U.S. Appl. No. 18/315,430 dated Oct. 3, 2025, 14 pages.

* cited by examiner

200

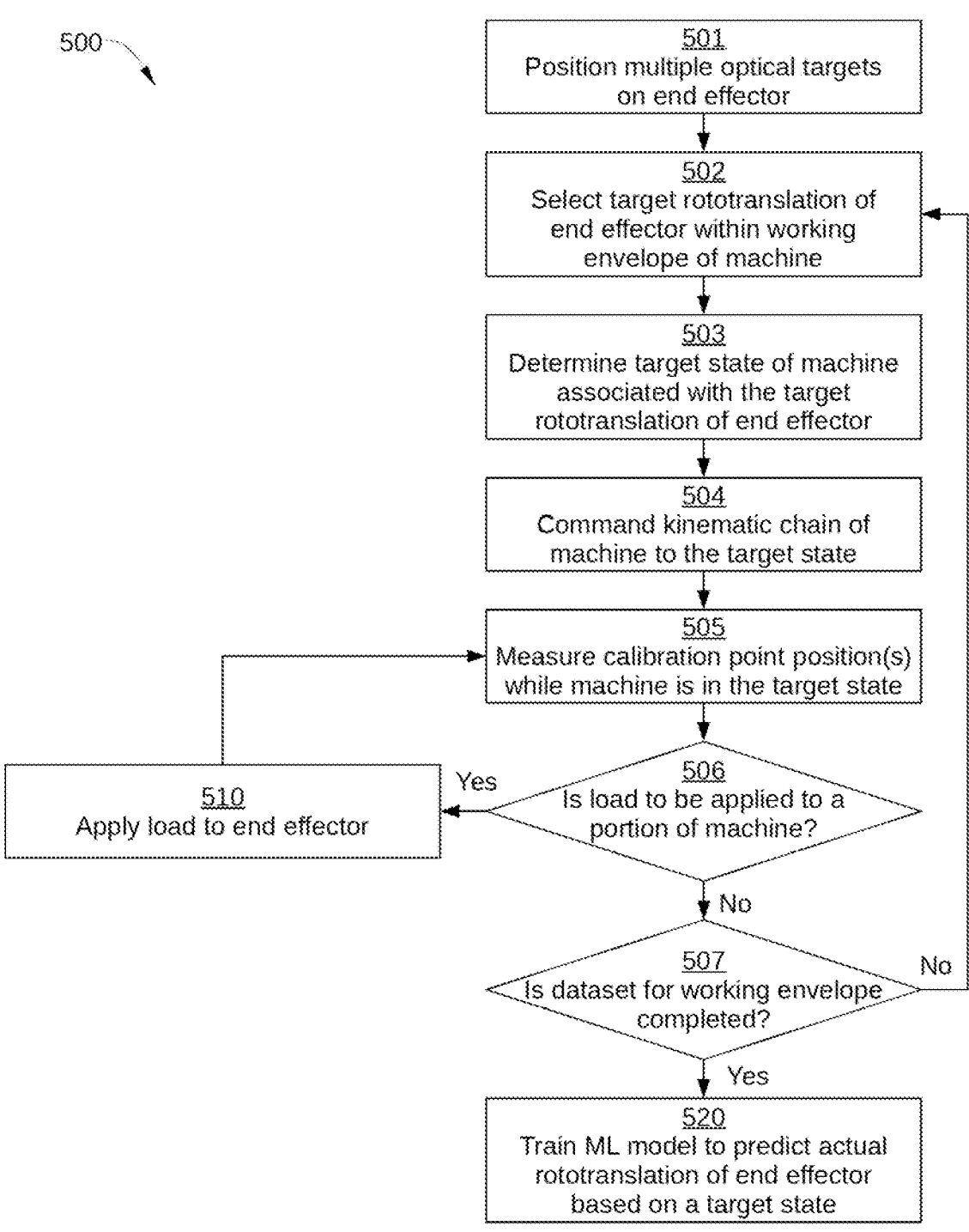

500

501
Position multiple optical targets on end effector

502
Select target rototranslation of end effector within working envelope of machine

503
Determine target state of machine associated with the target rototranslation of end effector

504
Command kinematic chain of machine to the target state

505
Measure calibration point position(s) while machine is in the target state

510
Apply load to end effector

506
Is load to be applied to a portion of machine?

Yes

No

507
Is dataset for working envelope completed?

No

Yes

520
Train ML model to predict actual rototranslation of end effector based on a target state

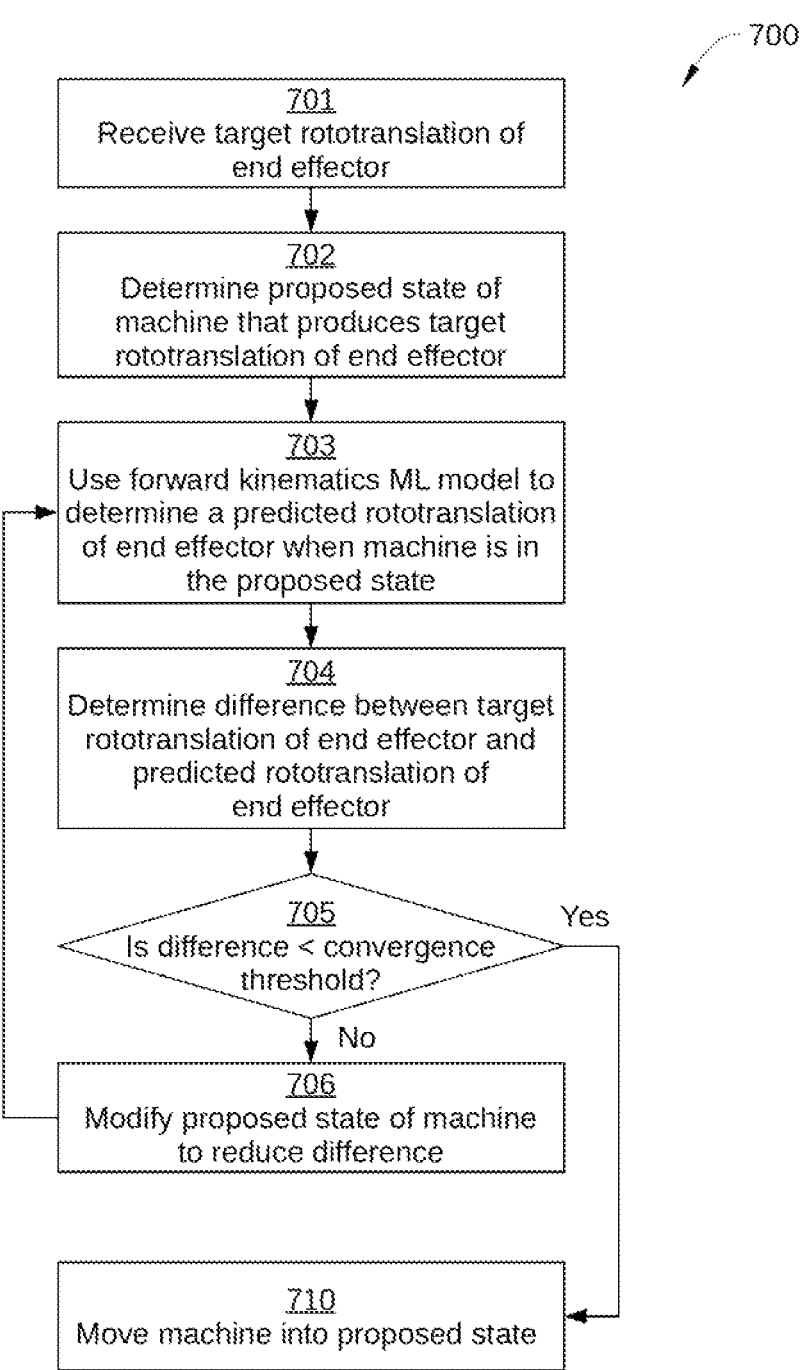

700

701
Receive target rototranslation of end effector

702
Determine proposed state of machine that produces target rototranslation of end effector 703
Use forward kinematics ML model to determine a predicted rototranslation of end effector when machine is in the proposed state 704
Determine difference between target rototranslation of end effector and predicted rototranslation of end effector 705
Is difference < convergence threshold?

Yes

No

706
Modify proposed state of machine to reduce difference

710
Move machine into proposed state

FIG. 7

TECHNIQUES FOR CONTROLLING MOVEMENT OF A MACHINE

CROSS-REFERENCE TO RELATED APPLICATIONS

This application claims priority benefit of the United States Provisional Patent Application titled, "TECHNIQUES FOR CONTROLLING MOVEMENT OF A MACHINE" filed on May 13, 2022, and having Ser. No. 63/341,985. The subject matter of this related application is hereby incorporated herein by reference.

BACKGROUND

Field of the Various Embodiments

The various embodiments relate generally to robotics and automation and machine learning, and, more specifically, to techniques for controlling movement of a machine.

DESCRIPTION OF THE RELATED ART

Computer-controlled processing machines, such as multiple-axis robots, computer-numerical control (CNC) machining systems, and three-dimensional (3D) printers, are designed to process workpieces with precision and repeatability. Manufacturing techniques employing such machines oftentimes can be highly automated, which advantageously enables large volumes of uniform products to be produced, even when those products have complex, three-dimensional surfaces. Computer-controlled processing machines are used in a variety of industries, such as manufacturing, semiconductor fabrication, construction, surgery, and the like, and typically include one or more movable parts. For example, multi-axis robots can include a robotic arm featuring a series of independently actuated linkages for precisely positioning and orienting an end effector, CNC machining systems can include movable machining tools translated by CNC, and 3D printers can include movable extruders that can be positioned relative to a workpiece in two or three dimensions.

A continuing challenge in the proper operation of computer-controlled processing machines is being able to control the actuators of these machines precisely when positioning and orienting an end effector (such as a movable machining tool, extruder, or laser engraver) at any point within a working volume with a small positioning error. For example, in many manufacturing applications, a positioning error at the end of the kinematic chain of a machine ideally does not exceed a few micrometers per meter. Further, in some manufacturing applications, low levels of positioning errors oftentimes must be maintained over relatively large working volumes that can be two or more cubic meters in size. As a general matter, providing such precise positioning control for an articulated robot or Cartesian CNC machine is a highly complex process requiring specialized techniques and hardware for successful implementation.

One technique for controlling a computer-controlled processing machine is implementing structural design features that increase the passive resistance of the machine to external forces. For example, by increasing the mass of certain components and/or the structural rigidity of the machine as a whole, and/or by including design features that dampen vibration, a computer-controlled processing machine can be less susceptible to positioning errors caused by component deflection under load and/or vibration of the end effector. A drawback of this technique, though, is that machines designed with these types of features can be larger, heavier, and more difficult to manufacture and install. Further, such machines are still subject to any positioning errors caused by thermal expansion.

Another technique for controlling computer-controlled processing machines is implementing inverse kinematics models in conjunction with calibrated position samples. For example, positioning control in a computer-controlled processing machine can be based on an analytical inverse kinematics model that is calibrated based on position samples obtained against absolute reference points using a calibrated laser tracker or other position-measuring instrument. A drawback of this technique, however, is that additional calibration procedures and specialized hardware are required for implementation. In addition, a processing machine that uses such positioning control also is generally still subject to positioning errors caused by thermal expansion.

Yet another technique for controlling computer-controlled processing machines is implementing closed-loop control systems that require a constant external reference to guide the motion process. For example, to improve the trajectory of an end effector during operation, vision systems and/or touch sensors can be employed for real-time position correction of the end effector within the working envelope of the computer-processing machine. A drawback of this technique, though, is that additional sensors and controls are required. Further, in some instances, collecting position feedback that is provided by touch sensors, vision systems, lasers, and other components can limit the speed at which a particular process can be performed.

As the foregoing illustrates, what is needed in the art are more effective techniques for controlling computer-controlled machines.

SUMMARY

A computer-implemented method for controlling a machine includes: determining a first state for the machine based on a kinematics model of the machine and a target roto-translation for an end effector associated with the machine; determining, using a forward-kinematics machine-learning model, a difference between the target roto-translation of the end effector and a first roto-translation of the end effector when the machine is in the first state; based on the difference between the target roto-translation and the first roto-translation, determining a second state for the machine; and outputting a control input for one or more actuators that causes the machine enter into the second state.

At least one technical advantage of the disclosed techniques relative to the prior art is that the disclosed techniques enable the positioning and orientation of an end effector of a computer-controlled processing machine with small positioning errors. Accordingly, the disclosed techniques enable lower-end computer-controlled processing machines to be operated with low position errors that were previously achievable only with more sophisticated processing machines. Another advantage of the disclosed techniques is that high-precision movement of an end effector can be accomplished without closed-loop control and the concomitant sensors and feedback systems, even in applications in which thermal and other environmental factors are difficult or impossible to predict. A further advantage of the disclosed techniques is that, once trained for a particular instance of computer-controlled processing machine, a machine-learning model that enables the precision positioning and orientation of an end effector can be readily trained for a different instance of the same computer-controlled processing machine using a smaller training dataset. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.1

FIG. 5 sets forth a flowchart of method steps for generating a forward-kinematics machine-learning model, according to various embodiments.

FIG. 7 sets forth a flowchart of method steps for controlling a machine having one or more movable parts, according to various embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
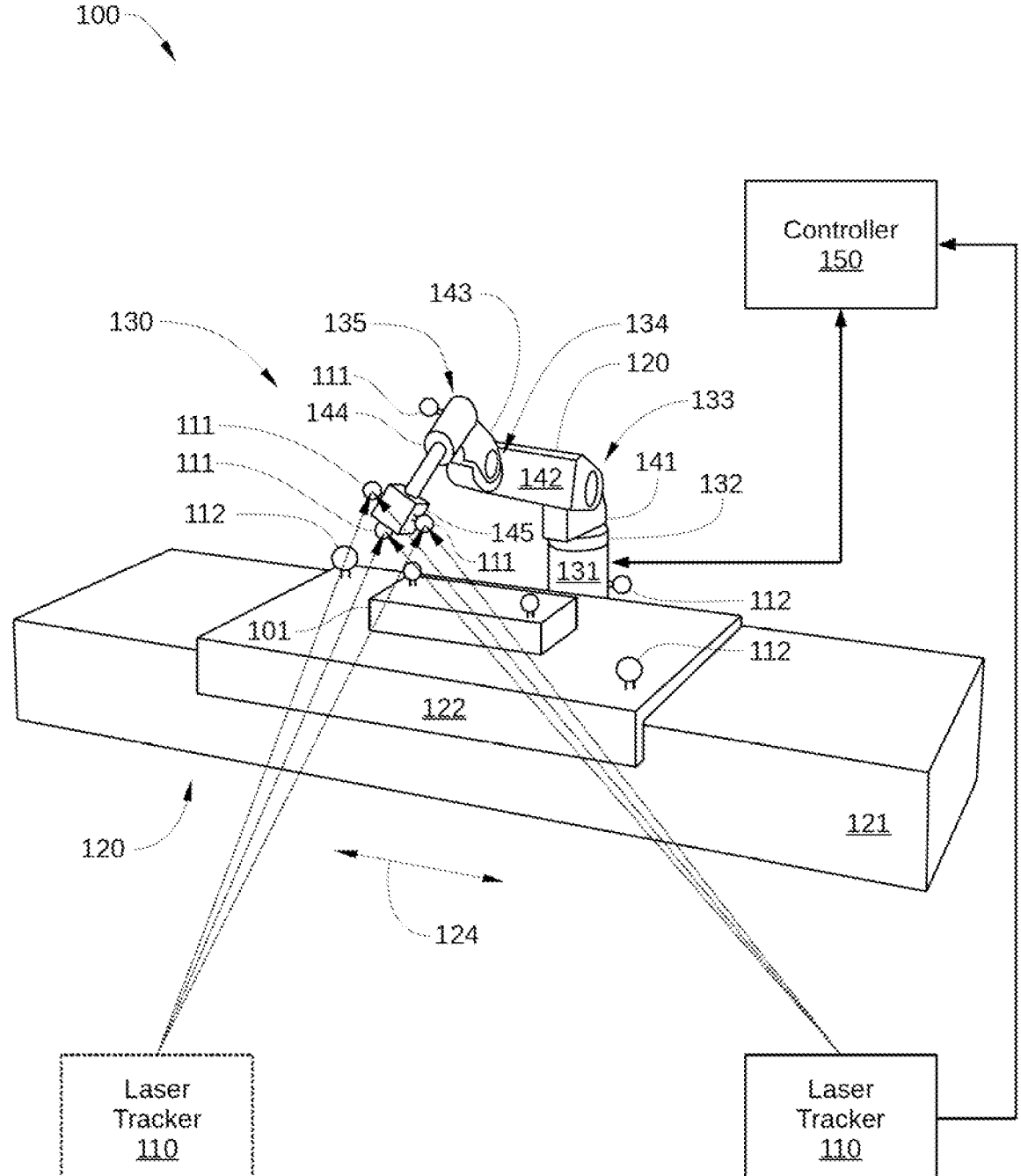
FIG. 1 illustrates a computer-controlled processing machine configured to implement one or more aspects of the various embodiments.

FIG. 1 illustrates a computer-controlled processing machine 100 configured to implement one or more aspects of the various embodiments. Computer-controlled processing machine 100 can be any computer-controlled workpiece processing machine, such as a computer-numerical control (CNC) machining system (e.g., a mill, lathe, drill, and/or the like), an array of multiple such machining systems, a three-dimensional (3D) printer, a laser-engraving machine, and the like. Computer-controlled processing machine 100 can be a polar-axis machine or robot, a Cartesian-motion machine or robot, a hybrid of each, or a delta robot or other robot that includes a parallel manipulator. As such, computer-controlled processing machine 100 is configured to perform one or more precise and repeatable processes on a workpiece 101, including material removal, surface texturization and/or functionalization, and coating application, among others.

In the embodiment illustrated in FIG. 1, computer-controlled processing machine 100 includes a table 120, a CNC positioner 130 and a controller 150. Also shown are one or more laser trackers 110 that can be used for measuring a training dataset of measured positions for an end effector 145 and/or for table 120. According to various embodiment described herein, the training dataset can be employed to train a forward kinematic machine-learning (ML) model (described below) for positioning and orienting end effector 145 and/or a movable stage 122 within a working envelope of computer-controlled processing machine 100.

Table 120 supports workpiece 101 during processing and, in the embodiment illustrated in FIG. 1, includes a base 121 and a movable stage 122 on which workpiece 101 is disposed. In some embodiments, movable stage 122 provides motion of workpiece 101 relative to positioner 130 along a single axis 124. In other embodiments, movable stage 122 provides motion of workpiece 101 relative to positioner 130 along a multiple axes, such as an XY or XYZ stage. As shown, in some embodiments, multiple optical targets 112 can be mounted to movable stage 122. In such embodiments, precise 3D position information for movable stage 122 can be collected for a training data set for a forward-kinematic ML model that models the kinematic behavior of movable stage 122.

CNC positioner 130 is a multi-axis positioning apparatus, such as a polar axis machine, that locates and orients end effector 145 in two or three dimensions with respect to workpiece 101. For example, in embodiments in which end effector 145 includes a laser-engraving head, CNC positioner 130 sequentially positions the laser-engraving head at different positions over surfaces of workpiece 101. Thus, in such embodiments, discrete engraving regions (patches) on one or more surfaces of workpiece 101 can undergo laser engraving and have a final pattern formed thereon, such as a texture or other surface geometry.

In the embodiment illustrated in FIG. 1, CNC positioner 130 includes base 131, a first axis 132, a second axis 133, a third axis 134 and a fourth axis 135. In some embodiments, CNC positioner 130 can further include a fifth and sixth axis (not shown for clarity). CNC positioner 130 further includes a first arm 141 that is coupled to base 131 via first axis 132, a second arm 142 that is coupled to first arm 141 via second axis 133, a third arm 143 that is coupled to second arm 142 via third axis 134, a fourth arm 144 that is coupled to third arm 143 via fourth axis 135, and end effector 145, which is coupled to fourth arm 144.

While not shown for clarity, each axis of CNC positioner 130 includes a different independent rotational actuator for first axis 132, second axis 133, third axis 134, and fourth axis 135. Each such rotational actuator places the corresponding axis of CNC positioner 130 in a target state (e.g., a specified rotational position) based on a control input value for that rotational actuator. Additionally or alternatively, in some embodiments, one or more of the axes or segments of CNC positioner 130 includes an independent translational actuator. Each such translational actuator places the corresponding axis or segment of CNC positioner 130 in a target state (e.g., a specified translational position) based on a control input value for that translational actuator. As employed herein, a target state of computer-controlled processing machine 100 corresponds to a desired pose or articulation of computer-controlled processing machine 100 that is intended to position and orient end effector 145 or movable stage 122 at a target roto-translation. Thus, a target state of computer-controlled processing machine 100 includes a rotation or translation value for each actuator of computer-controlled processing machine 100, and such rotation or translation values are state values.

In some embodiments, the target roto-translation can be a 3D-transform associated with end effector 145 or movable stage 122 that includes a translational component (up to three Cartesian values) and a rotational component (up to three angular values). In some embodiments, the target roto-translation indicates a target position of end effector 145 relative to base 131 and a target rotational orientation of end effector 145 relative to base 131. In other embodiments, the target roto-translation indicates a target position of movable stage 122 relative to base 131 and a target rotational orientation of movable stage 122 relative to base 121.

In other embodiments, laser-engraving system 100 includes more or fewer arms and/or joints than those shown in FIG. 1. Further, in some embodiments, CNC positioner 130 can have any other technically feasible multi-axis configuration, such as a Cartesian robot configuration or a hybrid polar-axis/Cartesion robot configuration. In some embodiments, base 131 is fixed in position relative to workpiece 101, for example to a supporting surface (not shown). In other embodiments, base 131 is configured to move relative to workpiece 100, for example in two or three dimensions.

End effector 145 is configured to perform one or more processes on workpiece 101, such as material removal (e.g., milling, drilling, and/or lathe operations), surface texturization and/or surface functionalization (e.g., via laser ablation), and the like. For example, in some embodiments, end effector 145 includes one or more motorized tools that are controlled based on machine control instructions for a specific process to be performed on workpiece 101. Alternatively or additionally, in some embodiments, end effector 145 includes a laser-engraving head.

In embodiments in which computer-controlled processing machine 100 is configured for performing a laser-engraving process, CNC positioner 130 includes optical and/or photonic fibers (not shown) that optically couple laser sources (not shown) to a laser-engraving head included in end effector 145. In such embodiments, the laser-engraving head typically includes or is coupled to a laser source for generating suitable laser pulses. In addition, the laser-engraving head typically includes a mirror positioning system and laser optics to direct the laser pulses to specific locations within an engraving region on a surface of workpiece 101.

Laser tracker 110 measures the three-dimensional (3D) position of various optical targets 111 positioned on end effector 145 of computer-controlled processing machine 100. Alternatively or additionally, in some embodiments, laser tracker 110 measures the three-dimensional position of various optical targets 112 positioned on movable stage 122 of table 120. In some embodiments, laser tracker 110 measures 3D position with a laser beam and angular encoders. Laser tracker 110 can be any technically feasible laser tracker device known in the art, many of which are commercially available. In operation, for each optical target 111 and/or 112 positioned within computer-controlled processing machine 100, laser tracker 110 directs a laser beam thereto, receives an optical signal (such as a return beam) from the optical target 111 or 112, determines the three-dimensional position of the optical target 111 or 112 based on the return beam, and generates position information for the optical target 111 or 112. The position information for each optical target 111 and/or 112 located within computer-controlled processing machine 100 is then provided to controller 150 as part of a training dataset for computer-controlled processing machine 100.

In some embodiments, some or all of optical targets 111 are spherically mounted retroreflectors (SMRs). An SMR is designed to reflect a laser beam back to laser tracker 110 with very little interference or distortion, and generally includes an outer shell (or "ball") and one or more corner-cube reflectors that have a reflective coating. As is well-known in the art, an SMR communicates position information to laser tracker 110 via the corner cube reflector. Specifically, an incident laser beam on an SMR from laser tracker 110 is directed to the center of the SMR and is reflected back to laser tracker 110 along a path that is parallel to but slightly offset from the incident laser beam. This offset is used by a position detector in laser tracker 110 to determine the location of the center of the SMR in three-dimensional space.

To precisely determine position and orientation of end effector 145 (and/or movable stage 122) in three-dimensional space relative to base 131 (or to base 121), the position of multiple optical targets 111 (or optical targets 112) in 3D space is needed to a high level of precision. Consequently, when using optical measuring devices, such as optical targets 111 and/or 112, line-of-sight visibility is generally necessary between the optical targets and the corresponding measuring device, such as laser tracker 110. However, in any given target state (or pose) of computer-controlled processing machine 100, one or more surfaces of end effector 145 are not visible to laser tracker 110. As a result, position measurements of optical targets mounted on occluded surfaces is prevented. Thus, the position of all surfaces of end effector 145 cannot be measured for a particular pose of computer-controlled processing machine 100 via a single laser tracker 110. In addition, optical targets 111 and 112 generally do not reflect light omnidirectionally, and therefore only generate a suitable return beam within a specific solid angle, which further limits the number of optical targets that can provide position information for a particular pose of computer-controlled processing machine 100. According to some embodiments, optical targets 111 and/or 112 are configured in "nests" of multiple optical targets. One embodiment of a nest of multiple optical targets is described below in conjunction with FIG. 2.

Figure 2:
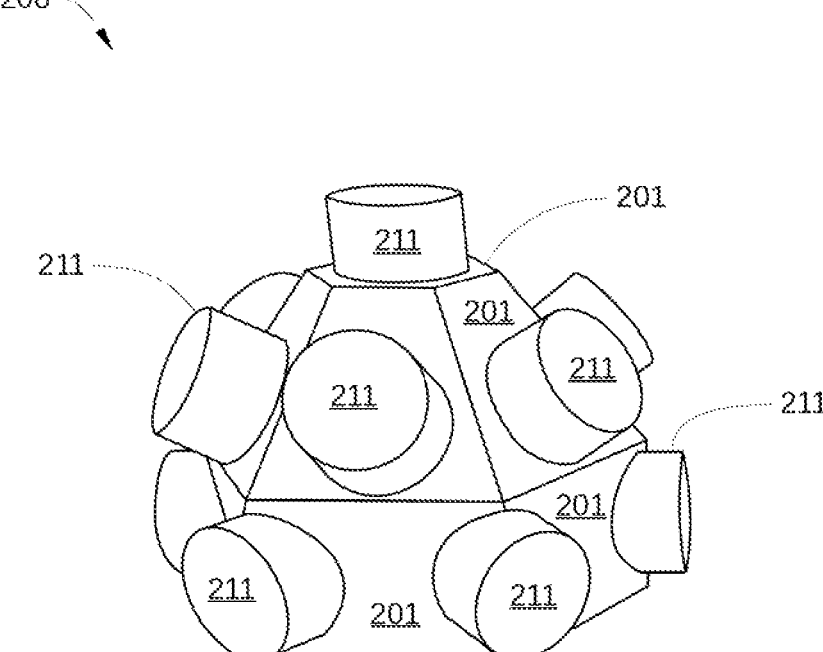
FIG. 2 is a more detailed illustration of an optical target nest that can be positioned within the computer-controlled processing machine of FIG. 1, according to various embodiments.

FIG. 2 is a more detailed illustration of an optical target nest 200 that can be positioned within computer-controlled processing machine 100, according to various embodiments. Optical target nest 200 can be mounted on a suitable surface of end effector 145 or movable stage 122 (shown in FIG. 1), and includes multiple optical targets 211. Each optical target can be consistent with optical targets 111 and/or 112 described above.

As shown, each optical target 211 is mounted on a different surface 201 of optical target nest 200, according to various embodiments. Therefore, each optical target 211 has a different orientation relative to a measuring device, such as laser tracker 110. In addition, each optical target 211 has a different position in 3D space relative to the surface on which optical target nest 200 is mounted. Based on the assumption that surface 201 is free of significant deflection, one of skill in the art can precisely reconstruct the relative positions of each optical target 211 relative to each other and to surface 201. Further, based on the assumption that there is no significant deflection or dimensional change between surface 201 and other surfaces on which other optical target nests are mounted, one of skill in the art can precisely reconstruct the relative positions of each optical target 211 included in optical target nest 200 with respect to the optical targets 211 included in an optical target nest (not shown) that is mounted on each of the other surfaces.

Returning to FIG. 1, controller 150 controls the operations of computer-controlled processing machine 100. In some embodiments, controller 150 receives user inputs and/or a 3D model for a particular workpiece 101 via a human-machine interface (not shown). In some embodiments, controller 150 is further configured to generate and execute a sequential program of machine control instructions (e.g., G-code and/or M-code) based on the 3D model. Alternatively or additionally, in some embodiments, the 3D model includes a suitable sequential program of machine-control instructions that are generated via computer-aided design (CAD) or computer-aided manufacturing (CAM) software by a computing device external to computer-controlled processing machine 100. In executing such machine-control instructions, controller 150 transmits control inputs to actuators included in CNC positioner 130 (and/or table 120) to cause end effector 145 and/or movable stage 122 to be position and oriented at a particular target roto-translation within a working envelope of computer-controlled processing machine 100. The performance of certain processing operations are enabled when end effector 145 and/or movable stage 122 are positioned and oriented at the particular target roto-translation.

According to various embodiments, controller 150 for a particular instance of computer-controlled processing machine 100 moves CNC positioner 130 and/or movable stage 122 to target roto-translations with significantly less position error than conventional methods. Specifically, the machine-control instructions executed by controller 150 are generated by a forward kinematic ML model for the particular instance of computer-controlled processing machine 100 based on a precisely measured training data set. Therefore, subtle changes in the kinematic behavior of the particular instance of computer-controlled processing machine 100 caused by environmental factors, tolerance variations of components, joint wear, actuator hysteresis, and the like can be taken into account when moving end effector 145 and/or movable stage 122 within a working envelope of the particular instance of computer-controlled processing machine 100. Embodiments of generating a training data set and training the forward kinematic ML model are described below in conjunction with FIGS. 5 and 6. Embodiments of controlling a machine using control inputs generated by the forward-kinematic ML model are described below in conjunction with FIG. 7.

Training Forward-Kinematic Machine-Learning Model

Generally, the quality of the output of processes performed by computer-controlled processing machine 100 is dependent on accurate positioning of an end effector 145 of CNC positioner 130 relative to workpiece 101. For example, when a process is performed on multiple patches on a surface of workpiece 101, such as a laser-engraving process, micron-level accuracy in the selection of each patch can be beneficial to the quality of output. According to various embodiments, computer-controlled processing machine 100 can be controlled with reduced positioning error via a forward-kinematics ML model. One embodiment of a forward-kinematic ML model is described below in conjunction with FIG. 3.

Figure 3:
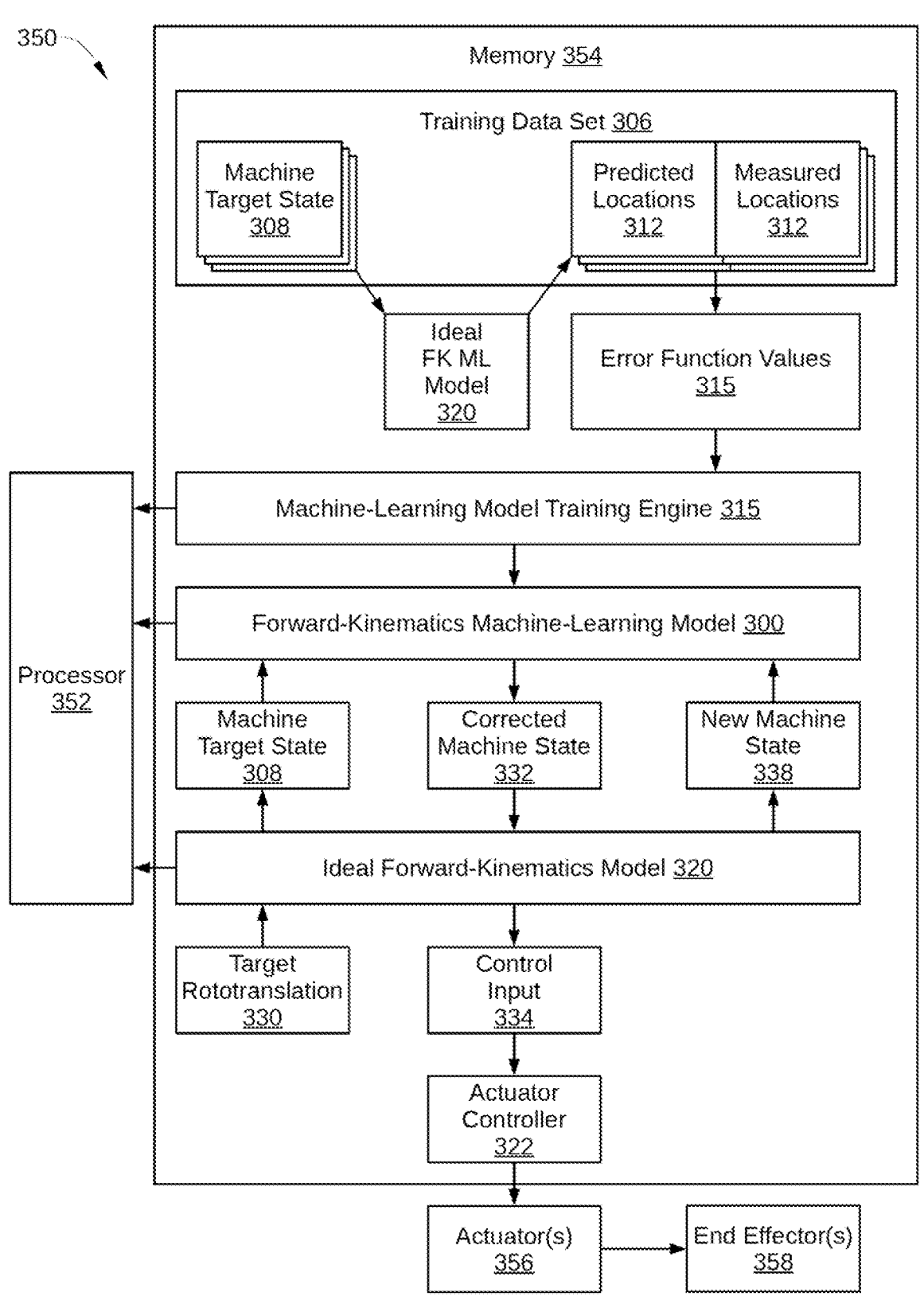
FIG. 3 schematically illustrates a forward-kinematic machine-learning model implemented with the computer-controlled processing machine of FIG. 1, according to various embodiments.

FIG. 3 schematically illustrates a forward-kinematic ML model 300 implemented with a computer-controlled processing machine 350, according to various embodiments. Forward-kinematic ML model 300 can be any technically feasible deep-learning model, a set of deep-learning models, or any other machine-learning model that can be trained in a supervised learning setting. In some embodiments, a loss is computed between predicted locations of calibration points and corresponding measured locations of the calibration points. In such embodiments, an optimization method is used to minimize the computed loss. Optimization methods that can be employed by forward-kinematic ML model 300 include gradient descent, Adam, AdaGrad, RMSProp, and/or other approaches for numerical minimization. By training forward-kinematic ML model 300 in this way for a sufficiently large number of iterations, forward-kinematic ML model 300 can learn a mapping between a target roto-translation of an end effector of computer-controlled processing machine 350 and an actual roto-translation of the end effector when computer-controlled processing machine 350 is configured in a particular machine target state 308. Thus, forward-kinematic ML model 300 is trained to predict the forward kinematics of the end effector by including displacements not included in an ideal forward-kinematics model of computer-controlled processing machine 350.

Computer-controlled processing machine 350 can be any technically feasible processing machine with one or more movable parts that is consistent with computer-controlled processing machine 100 of FIG. 1. In the embodiment illustrated in FIG. 3, computer-controlled processing machine 350 includes a processor 352, a memory 354, and one or more actuators 356 coupled to one or more end effectors 358. As shown, memory 354 includes a training data set 306, a machine learning model training engine 316, forward-kinetic ML model 300, an ideal forward-kinematics model 320 of computer-controlled processing machine 350, and an actuator controller 322.

The processor 352 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU. In general, processor 352 can be any technically feasible hardware unit capable of processing data and/or executing software applications.

Memory 354 can include a random-access memory (RAM) module, a flash memory unit, or any other type of memory unit or combination thereof. Processor 352 is configured to read data from and write data to memory 354. Memory 354 includes various software programs (e.g., an operating system, one or more applications) that can be executed by processor 352 and application data associated with the software programs. While not shown, computer-controlled processing machine 350 can further include storage. The storage can include non-volatile storage for applications and data and can include fixed or removable disk drives, flash memory devices, and CD-ROM, DVD-ROM, Blu-Ray, HD-DVD, or other magnetic, optical, or solid-state storage devices. While not shown, computer-controlled processing machine 350 can further include an interconnect bus that connects two or more of processor 352, memory 354, the storage, and the one or more actuators 356.

The one or more actuators 356 can include rotational and/or translational actuators, such as stepper motors, linear drives, and the like. Generally, each actuator 356 is associated with the motion of a different segment or other movable portion of computer-controlled processing machine 350. The one or more end effectors 358 can be consistent with end effector 145 in FIG. 1.

In the embodiments, the kinematic behavior of computer-controlled processing machine 350, or of any other multi-axis computer-controlled machine, is modeled with a high degree of accuracy via forward kinematics ML model 300. As a result, position error that does not exceed a few micrometers per meter of the one or more end effectors 358 can be achieved by actuators 356. Such high-accuracy positioning of the one or more end effectors 358 can be realized even in environments subject to variations in ambient temperature, atmospheric pressure, atmospheric humidity, and/or other environmental factors. Further, such high-accuracy positioning of the one or more end effectors 358 can be realized without closed-loop control of actuators 356.

In some embodiments, forward kinematics ML model 300 is a high-dimensional, fully differentiable forward kinematics ML model that approximates the kinematic behavior of computer-controlled machine 350 and structural stress and strain experienced by computer-controlled machine 350 as a result of gravity and other forces. In such embodiments, forward kinematics ML model 300 is trained with data collected by positioning multiple calibration targets on computer-controlled processing machine 350 (such as optical targets 111 and/or 112, shown in FIG. 1) and moving computer-controlled processing machine 350 into various target poses, i.e., machine target states 308, that sample the working envelope of computer-controlled machine 350. For example, in some embodiments, machine target states 308 are selected that position and orient the one or more end effectors 358 across the range of positions and orientations employed for performing processing operations on a workpiece. Thus, in such embodiments, machine target states 308 may represent a limited portion of the total possible positions and orientations of the one or more end effectors 358. Machine target states 308 for an example embodiment of computer-controlled processing machine 350 are described below in conjunction with FIG. 4.

Figure 4:
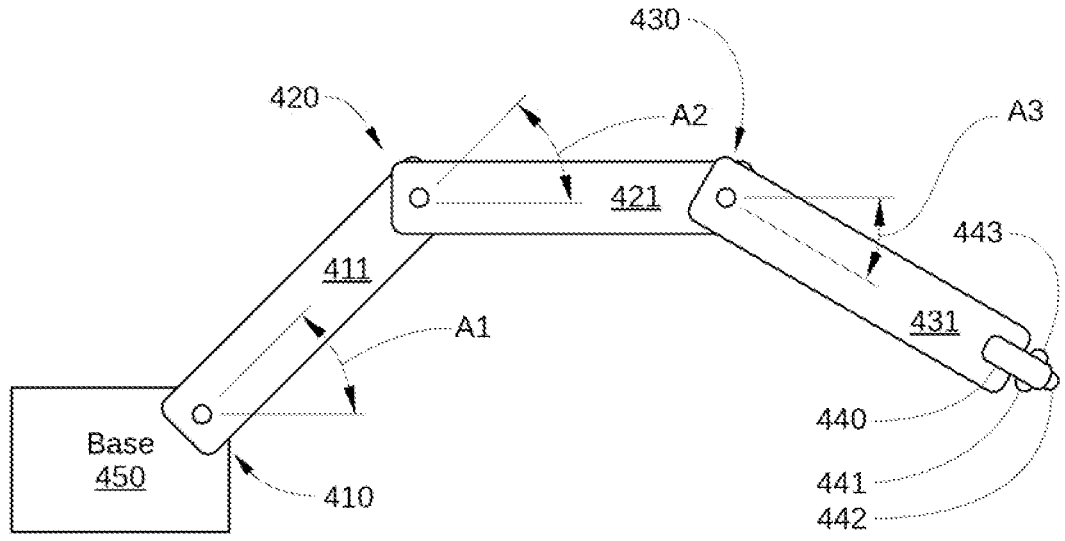
FIG. 4 schematically illustrates a more detailed illustration of the computer-controlled processing machine of FIG. 3, according to various embodiments.

FIG. 4 schematically illustrates a more detailed illustration of computer-controlled processing machine 350, according to various embodiments. In the embodiment illustrated in FIG. 4, computer-controlled processing machine 350 is configured as a simplified 3-axis industrial robot that includes a base 450, a first joint 410 that couples base 450 to a first segment 411, a second joint 420 that couples first segment 411 to a second segment 421, a third joint 430 that couples second segment 421 to a third segment 431, and an end effector 440 that is disposed on third segment 431. In the embodiment illustrated in FIG. 4, first joint 410 includes a rotational actuator that rotates first joint 410 to a joint rotation angle A1 specified by a control input from actuator controller 332 of FIG. 3, second joint 420 includes a rotational actuator that rotates second joint 420 to a joint rotation angle A2 specified by a control input from actuator controller 332, and third joint 430 includes a rotational actuator that rotates third joint 430 to a joint rotation angle A3 specified by a control input from actuator controller 332. In other embodiments, computer-controlled processing machine 350 can include one or more translational actuators in addition to or in lieu of the rotational actuators associated with first joint 410, second joint 420, and/or third joint 430.

A machine target state 308 indicates a desired position of computer-controlled processing machine 350, for example as a set of N state values, where each of the N state values represents the state of an individual machine axis or joint. Each of these N state values may represent a linear displacement for a linear axis or an angular value for a polar axis. In embodiments in which computer-controlled processing machine 350 includes first joint 410, second joint 420, and third joint 430, a state of computer-controlled processing machine 350 includes a joint rotation value A1 for first joint 410, a joint rotation value A2 for second joint 420, and a joint rotation value A3 for third joint 430. Thus, in such embodiments, a machine target state 308 indicates the angles of rotation for first joint 410, second joint 420, and third joint 430 that cause computer-controlled processing machine 350 to be configured in a specified target pose or target articulation. For example, a particular machine target state 308 may indicate state values for joint rotation angles A1, A2, and A3 that cause computer-controlled processing machine 350 to position and orient end effector 440 at a target roto-translation relative to base 450. In such embodiments, the target roto-translation of end effector 440 indicates a target position of end effector 440 relative to base 450 and a target rotational orientation of end effector 440 relative to base 450. In the embodiment illustrated in FIG. 4, a state of computer-controlled processing machine 350 can only include rotation values for the joints of computer-controlled processing machine 350. In embodiments in which computer-controlled processing machine 350 includes one or more translational actuators, a state of computer-controlled processing machine 350 can include one or more translation values for such translational actuators.

Also shown in FIG. 4 are the positions of multiple calibration points 441-443 that are mounted on end effector 440. As described in greater detail below, the measured location of calibration points 441-443 and the predicted location of calibration points 441-443 are employed in the training of forward-kinetic ML model 300.

Each calibration point 441-443 corresponds to a location in 3D space of an optical target, such as an optical target 111 of FIG. 1. Although not shown in FIG. 4, in some embodiments, each such optical target can be included in a group of optical targets that are mounted together on a particular surface of end effector 440, such as an optical target nest 200 of FIG. 2. Thus, in such embodiments, there are typically multiple calibration points 441-443 associated with each of several surfaces of end effector 440. Consequently, there can be many more calibration points associated with end effector 440 than shown in FIG. 4. For example, in some embodiments, an optical target nest 200 of five or more optical targets can be mounted on four or five different surfaces of end effector 440, so that the total number of calibration points associated with end effector 440 can exceed 20 or more.

Returning to FIG. 3, training dataset 306 can include, for each machine target state 308, a set of predicted locations 312 of the calibration targets and a corresponding set of measured locations 314 of the calibration targets. In some embodiments, each of the predicted locations 312 of the calibration targets is initially determined based on a specific machine target state 308. In such embodiments, for a specific machine target state 308, an initial predicted roto-translation of an end effector 358 is determined using ideal forward-kinematics model 320 to calculate an ideal roto-translation of the end effector 358. Thus, the initial predicted roto-translation of the end effector 358 is determined based on an ideal kinematic representation of the kinematic behavior of computer-controlled processing machine 350. In some embodiments, ideal forward-kinematics model 320 assumes that an ideal kinematic chain exists from the spatial location of base 450 to the end effector 358. For example, elements of such an ideal kinematic chain are generally identical for each manufactured instance of computer-controlled processing machine 350, and do not include the realities of manufacturing tolerances, actuator hysteresis, and/or dimensional change due to thermal expansion. In such embodiments, the ideal kinematic chain can be a concatenation of four affine transformation matrices, one representing the location of base 450, and three representing the contributions of joint offsets and/or angles in each of joints 410, 420, and 430. As forward-kinetic ML model 300 is trained by machine learning model training engine 316, predicted locations 312 of the calibration targets for a specific machine target state 308 are generated by forward-kinetic ML model 300 until an error function associated with training forward-kinetic ML model 300 converges. For example, in some embodiments, such an error function converges when error function values 315 fall below a threshold value.

As noted above, for each machine target state 308 there is an associated set of measured locations 314 of the calibration targets that corresponds with a set of predicted locations 312 of the calibration targets. In some embodiments, each of the measured locations 314 of the calibration targets is measured prior to training forward-kinetic ML model 300. In such embodiments, for a specific machine target state 308, precise measurements of the 3D positions of calibration targets are performed with a high-accuracy measuring device, such as a laser tracker 110. It is noted that not all calibration targets can be measured for a particular machine target state 308, because some, or even most, calibration targets are not within line of sight of the measuring device when computer-controlled processing machine 350 is in the particular machine target state 308. The measurement of a set of measured locations 314 of the calibration targets for each machine target state 308 completes training dataset 306 for a particular instance of computer-controlled processing machine 350.

In some embodiments, each machine target state 308 includes additional factors that affects kinematic behavior of computer-controlled processing machine 350. For example, in some embodiments, a particular machine target state 308 includes a load that is applied to an axis or end effector 358 of computer-controlled processing machine 350. In another example, in some embodiments, the particular machine target state 308 includes an environmental factor that can affect the kinematic behavior of computer-controlled processing machine 350, such as an ambient temperature, an atmospheric pressure, or an atmospheric humidity. In such embodiments, for the particular machine target state 308, training data set 106 includes a set of predicted locations 312 of the calibration targets and a corresponding set of measured locations 314 of the calibration targets. Thus, for the particular machine target state 308, dedicated measurements of the calibration targets are performed prior to training forward kinematics ML model 300. In addition, for the particular machine target state 308, a training process is performed for forward kinematics ML model 300 so that forward kinematics ML model 300 includes the factor affecting the kinematic behavior of computer-controlled processing machine 350 as a model parameter. As a result, forward kinematics ML model 300 can take into account different values of the factor that have not been directly trained for. For example, upon completion of training of forward kinematics ML model 300 when computer-controlled processing machine 350 is in a 20° C. environment and a 30° C. environment, forward kinematics ML model 300 can accurately predict the effect on the kinematic behavior of computer-controlled processing machine 350 in a 25° C. environment. Similarly, upon completion of training of forward kinematics ML model 300 when computer-controlled processing machine 350 undergoes different loads at an end effector 358, forward kinematics ML model 300 can accurately predict the effect on the kinematic behavior of computer-controlled processing machine 350 caused by different loads than those included in training dataset 306.

In operation, forward-kinematics ML model 300 receives a target roto-translation 330 of an end effector 358, indicating a precise position and orientation of the end effector 358. In some embodiments, forward-kinematics ML model 300 further receives additional factors, such as one or more environmental factors and/or loads applied to computer-controlled processing machine 350. In some embodiments, target roto-translation 330 of the end effector is then converted into a suitable machine target state 308, for example via ideal forward-kinematics model 320. In such embodiments, an inverse kinematics procedure can be performed using ideal forward-kinematics model 320 to generate the suitable machine target state 308. Based on the machine target state 308, forward kinematics ML model 300 generates a corrected machine state 332. In some embodiments, forward kinematics ML model 300 determines the corrected machine state 332 iteratively by calculating a difference between target roto-translation 330 of the end effector 358 and a predicted roto-translation of the end effector 358. In such embodiments, the predicted roto-translation is calculated by forward kinematics ML model 300 when computer-controlled processing machine 350 is in the machine target state 308. When the difference between target roto-translation 330 and the predicted roto-translation exceeds a threshold value, the predicted roto-translation is employed to generate a new machine state 338 and another corrected machine state 332 is calculated. Once the difference between target roto-translation 330 and the predicted roto-translation falls below the threshold value, the corrected machine state 332 is used to generate control inputs 334 for actuator controller 322. Actuator controller 322 then provides suitable control signals to actuators 356 so that computer-controlled machine 350 is configured in corrected machine state 332. Embodiments of generating training data set 306 and training forward kinematic ML model 300 are described below in conjunction with FIGS. 5 and 6. Embodiments of controlling movement of a computer-controlled machine using control inputs generated by forward-kinematic ML model 300 are described below in conjunction with FIG. 7.

Training Forward-Kinematic Machine-Learning Model

FIG. 5 sets forth a flowchart of method steps for generating a forward-kinematics ML model, according to various embodiments. Although the method steps are described in conjunction with the systems of FIGS. 1-4, persons skilled in the art will understand that any system configured to perform the method steps, in any order, is within the scope of the embodiments.

In some embodiments, prior to the method steps, a plurality of target roto-translations for end effector 145 and/or target machine states 308 are determined. For example the target roto-translations and/or target machine states 308 can be selected to span a portion of the working envelope of computer-controlled processing machine 100 that benefits from low position error of end effector 145. In addition, in an instance in which an environmental factor is to be considered as a model parameter of forward-kinematic ML model 300, prior to the method steps, the environmental factor (such as ambient temperature, atmospheric pressure, atmospheric humidity) is controlled to a known and steady state.

As shown, a computer-implemented method 500 begins at step 501, where multiple optical targets are positioned on one or more surfaces of end effector 145. In some embodiments, multiple optical targets 111 are positioned on each such surface. In such embodiments, the multiple optical targets 111 positioned on one surface can be mounted together on a single optical target nest 200.

In step 502, a target roto-translation of end effector 145 is selected. As noted, in some embodiments, a plurality of such target roto-translations is determined prior to computer-implemented method 500.

In step 503, a target machine state 308 is determined based on the target roto-translation selected in step 502. In some embodiments, the target machine state 308 is determined via an inverse kinematics procedure that can be performed using ideal forward-kinematics model 320.

In step 504, the kinematic chain of computer-controlled processing machine 100 is commanded to the target machine state 308 determined in step 503. Thus, each actuator of computer-controlled processing machine 100 is moved to a state value indicated in target machine state 308.

In step 505, the positions of one or more calibration points is measured, for example via laser tracker 110, to generate set of measured locations 314 of the calibration targets. As described above, the calibration points are associated with one or more surfaces of end effector 145 while computer-controlled processing machine 100 is configured in the target machine state 308 determined in step 503. In some embodiments, multiple laser trackers or other measuring devices can be employed in step 505 to collect measurements from most or all calibration points associated with target machine state 308. Alternatively, in some embodiments, laser tracker 110 is moved to a second position in step 505 to collect additional measurements of calibration point locations.

In step 506, controller 150 determines whether a load is to be applied to computer-controlled processing machine 100 so that another set of measured locations 314 of the calibration targets can be collected while computer-controlled processing machine 100 is configured in the target machine state 308 determined in step 503. If yes, computer-implemented method 500 proceeds to step 510; if no, then computer-implemented method 500 proceeds to step 507.

In step 507, controller 150 determines whether training dataset 306 is complete. For example, in some embodiments, controller 150 determines whether a set of measured locations 314 of the calibration targets for all target machine states 308 associated with the working envelope of computer-controlled processing machine 100 has been collected. If no, computer-implemented method 500 returns to step 502; if yes, computer-implemented method 500 proceeds to step 520.

In step 510, a suitable load is applied to one or more axes and/or end effector 145. Thus, computer-controlled processing machine 100 is placed in a different state and an additional set of measured locations 314 of the calibration targets can be collected in an additional iteration of step 505.

In step 520, forward-kinematic ML model 300 is trained to predict an actual roto-translation of end effector 145 when computer-controlled processing machine 100 is configured in a specified target machine state 308. Therefore, forward-kinematic ML model 300 can determine position error of end effector 145 caused by environmental factors, tolerance variations of components, joint wear, actuator hysteresis, and the like, which can be taken into account by an ideal forward-kinematics model for computer-controlled processing machine 100. An embodiment of training forward kinematic ML model 300 is described below in conjunction FIG. 6.

Figure 6:
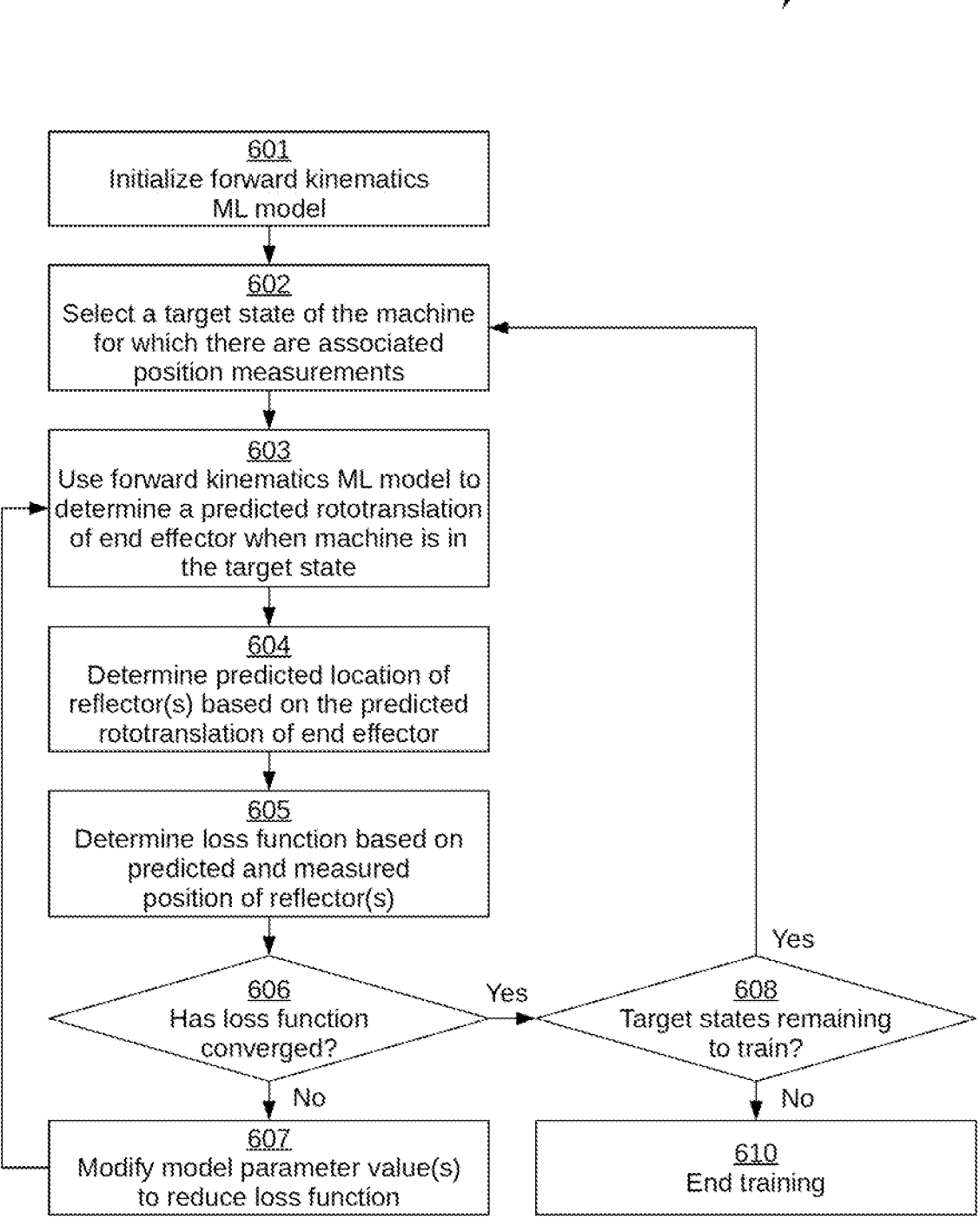
FIG. 6 sets forth a flowchart of method steps for training a forward-kinematics machine-learning model, according to various embodiments.

FIG. 6 sets forth a flowchart of method steps for training a forward-kinematics ML model, according to various embodiments. Although the method steps are described in conjunction with the systems of FIGS. 1-4, persons skilled in the art will understand that any system configured to perform the method steps, in any order, is within the scope of the embodiments. Prior to the method steps, a set of measured locations 314 of calibration targets are collected for each of a plurality of target machine state 308.

As shown, a computer-implemented method 600 begins at step 601, where forward-kinematic ML model 300 is initialized. For example, in some embodiments, values for the model parameters of forward-kinematic ML model 300 can be set to initially predict roto-translation (position and orientation) of end effector 145 assuming an ideal forward kinematic model of computer-controlled processing machine 100. In embodiments in which forward-kinematic ML model 300 has been previously trained for a substantially identical instance of computer-controlled processing machine 100, some or all values for the model parameters of forward-kinematic ML model 300 can be taken from such previous training.

In step 602, a target machine state 308 is selected for which there is a corresponding set of measured locations 314 of calibration targets. For example, such sets of measured locations 314 of calibration targets can be generated via computer-implemented method 500 of FIG. 5.

In step 603, forward-kinematic ML model 300 determines a predicted roto-translation of end effector 145 when computer-controlled processing machine 100 is configured in the target machine state 308 selected in step 602. In some embodiments, an artificial neural network (ANN) of forward-kinematic ML model 300 is trained using a supervised learning process, where the ANN has an input vector based on target machine state 308 and generates an output vector.

In some embodiments, the input vector includes: joint rotation angle A1, joint rotation angle A2, joint rotation angle A3, an ideal joint position $P1i$ for first joint 410, an ideal joint position $P2i$ for second joint 420, an ideal joint position $P3i$ for third joint 430, and a rigid transform $T_{reflector}$ between the optical targets of each calibration point. In such embodiments, ideal joint position $P1i$, ideal joint position $P2i$, and ideal joint position $P3i$ are calculated via ideal forward-kinematics model 320. In some embodiments, the input vector for the ANN can include one or more additional factors, such as ambient temperature, atmospheric pressure, atmospheric humidity, and/or specified loads. In some embodiments, the output vector includes: a position delta $P_{delta}$ for end effector 145 (for example, in three dimensions) and an orientation delta $R_{delta}$ (for example, in three directions).

In step 604, forward-kinematic ML model 300 determines the N predicted locations $L_{reflector,k}$ of the K optical targets associated with end effector 145. Generally, predicted location $L_{reflector,k}$ for optical target k includes three-dimensional position information for the calibration point associated with optical target k. In step 604, forward-kinematic ML model 300 determines the K predicted locations $L_{reflector,k}$ of the K optical targets based on the position delta $P_{delta}$ for end effector 145, the orientation delta $R_{delta}$, and the rigid transform $T_{reflector}$ between the optical targets. In some embodiments, an optimization is performed to reconstruct the relative positions in three dimensional space of the K optical targets.

In step 605, a loss function is determined based on the difference in three-dimensional space between the K predicted locations $L_{reflector,k}$ of the K optical targets and the measured locations 314 of the calibration targets.

In step 606, forward-kinematic ML model 300 determines whether the loss function has converged, such as when error function values 315 fall below a threshold value. If yes, computer-implemented method 600 proceeds to step 608; if no, computer-implemented method 600 proceeds to step 607.

In step 607, forward-kinematic ML model 300 modifies one or more values for model parameters included in forward-kinematic ML model 300. Computer-implemented method 600 then returns to step 603 and a new predicted roto-translation of end effector 145 is determined. In step 607, the new values for the model parameters are selected to reduce the loss function determined in step 605. In some embodiments, forward-kinematic ML model 300 selects new values for the model parameters via an optimization method that minimizes the loss function. Examples of suitable optimization methods include gradient descent, Adam, AdaGrad, and RMSProp, among others.

In step 608, which is performed in response to the loss function converging, forward-kinematic ML model 300 determines whether there are any machine target states 308 remaining to be trained. If yes, computer-implemented method 600 returns to step 602 and forward-kinematic ML model 300 is trained for another machine target states 308; if no, computer-implemented method 600 proceeds to step 610 and terminates.

Forward-Kinematic Machine-Learning Model for Motion Control

FIG. 7 sets forth a flowchart of method steps for controlling a machine having one or more movable parts, according to various embodiments. Although the method steps are described in conjunction with the systems of FIGS. 1-4, persons skilled in the art will understand that any system configured to perform the method steps, in any order, is within the scope of the embodiments.

As shown, a computer-implemented method 700 begins at step 701, where controller 150 receives a target roto-translation 330 of end effector 145, indicating a precise position and orientation of end effector 145. For example, the target roto-translation 330 enables the end effector 358 to perform certain operations on a workpiece.

In step 702, controller 150 determines a proposed state of computer-controlled processing machine 100 to produce target roto-translation 330. For example, in some embodiments, controller 150 uses forward kinematics ML model 300 to determine the proposed state of computer-controlled processing machine 100 in step 702. Alternatively, in some embodiments, controller 150 uses ideal forward-kinematics model 320 for an initial proposed state of computer-controlled processing machine 100 for producing target roto-translation 330.

In step 703, controller 150 determines a predicted roto-translation of end effector 145 when computer-controlled processing machine 100 is in the proposed state determined in step 702. In some embodiments, controller 150 uses forward kinematics ML model 300 to determine the predicted roto-translation of end effector 145.

In step 704, controller 150 (or alternatively forward kinematics ML model 300) determines a difference between target roto-translation 330 of end effector 145 and the predicted roto-translation determined in step 703. Generally, the difference determined in step 704 is a distance or displacement in three-dimensional space, and can include a three-dimensional positional difference and a three-dimensional rotational difference.

In step 705, controller 150 (or alternatively forward kinematics ML model 300) determines whether the difference determined in step 704 is less than a convergence threshold. If yes, computer-implemented method 700 proceeds to step 710; if no, computer-implemented method 700 proceeds to step 706. Thus, when the current predicted roto-translation determined in step 703 approaches the target rototranslation 330, controller 150 uses the current predicted roto-translation in step 710.

In step 706, forward kinematics ML model 300 modifies the proposed state of computer-controlled processing machine 100 to reduce the difference determined in step 704. Computer-implemented method 700 then returns to step 702.

In step 710, controller 150 produces suitable control inputs to cause computer-controlled processing machine 100 to move into or enter into the proposed state determined in the last iteration of step 703. In step 710, controller 150 produces the control inputs based on the current predicted roto-translation.

In sum, the various embodiments described herein provide techniques for generating a high-precision forward-kinematics ML model that correlates the position and orientation of an end effector of a computer-controlled machine with a base of the machine. The forward-kinematics ML model is trained using measured locations of a plurality of calibration points over a plurality of machine states. After training, the forward-kinematics ML model can predict the position and orientation of the end effector based on the specific position and orientation of each joint or axis of the machine.

At least one technical advantage of the disclosed techniques relative to the prior art is that the disclosed techniques enable the positioning and orientation of an end effector of a computer-controlled processing machine with a very small positioning error. Therefore, conventional computer-controlled processing machines can be operated with the low position error previously only achievable by more sophisticated processing machines. Another advantage of the disclosed techniques is that high-precision movement of an end effector can be accomplished without closed-loop control and the concomitant sensors and feedback systems, even in applications in which thermal and other environmental factors are difficult or impossible to control. A further advantage of the disclosed techniques is that, once trained for a particular instance of computer-controlled processing machine, a machine-learning model that enables the positioning and orientation of an end effector can readily be trained for a different instance of the same computer-controlled processing machine using a much smaller training dataset. These technical advantages provide one or more technological advancements over prior art approaches.

1. In some embodiments, a computer-implemented method for controlling a machine comprises: determining a first state for the machine based on a kinematics model of the machine and a target roto-translation for an end effector associated with the machine; determining, using a forward-kinematics machine-learning model, a difference between the target roto-translation of the end effector and a first roto-translation of the end effector when the machine is in the first state; based on the difference between the target roto-translation and the first roto-translation, determining a second state for the machine; and outputting a control input for one or more actuators that causes the machine enter into the second state.

2. The computer-implemented method of clause 1, wherein a difference between the target roto-translation and a second roto-translation for the end effector when the machine is in the second state is less than the difference between the target roto-translation and the first roto-translation.

3. The computer-implemented method of clauses 1 or 2, wherein the first state for the machine includes a state value for each actuator associated with the machine.

4. The computer-implemented method of any of clauses 1-3, wherein the state value for each actuator comprises either a rotation value a translation value.

5. The computer-implemented method of any of clauses 1-4, wherein the target roto-translation comprises a target position of the end effector relative to a base of the machine and a target orientation of the end effector relative to the base.

6. The computer-implemented method of any of clauses 1-5, wherein the kinematics model of the machine is based on an ideal representation of kinematic behavior of the machine.

7. The computer-implemented method of any of clauses 1-6, wherein the ideal representation of the kinematic behavior of the machine includes an ideal kinematic chain from a base of the machine to the end effector.

8. The computer-implemented method of any of clauses 1-7, further comprising, prior to outputting the control input for the one or more actuators, determining that the difference is less than a threshold convergence value.

9. The computer-implemented method of any of clauses 1-8, wherein determining the first state for the machine is further based on a third state for the machine that is determined prior to determining the first state for the machine.

10. The computer-implemented method of any of clauses 1-9, wherein determining the third state for the machine comprises: determining the third state for the machine based on the kinematics model of the machine and the target roto-translation for the end effector; and determining, using the forward-kinematics machine-learning model, a difference between the target roto-translation of the end effector and a third roto-translation of the end effector when the machine is in the third state.

11. The computer-implemented method of any of clauses 1-10, further comprising determining that the difference between the target roto-translation of the end effector and the third roto-translation is greater than the threshold convergence value.

12. The computer-implemented method of any of clauses 1-11, wherein the first state for the machine is further based on the difference between the target roto-translation of the end effector and the third roto-translation.

13. In some embodiments, a non-transitory computer readable medium includes a set of instructions which, in response to execution by a processor of a computer system, cause the processor to perform the steps of: determining a first state for a machine based on a kinematics model of the machine and a target roto-translation for an end effector associated with the machine; determining, using a forward-kinematics machine-learning model, a difference between the target roto-translation of the end effector and a first roto-translation of the end effector when the machine is in the first state; based on the difference between the target roto-translation and the first roto-translation, determining a second state for the machine; and outputting a control input for one or more actuators that causes the machine enter into the second state.

14. The non-transitory computer readable medium of clause 13, wherein a difference between the target roto-translation and a second roto-translation for the end effector when the machine is in the second state is less than the difference between the target roto-translation and the first roto-translation.

15. The non-transitory computer readable medium of clauses 13 or 14, wherein the first state for the machine includes a state value for each actuator associated with the machine.

16. The non-transitory computer readable medium of any of clauses 1-15, wherein the state value for each actuator comprises either a rotation value a translation value.

17. The non-transitory computer readable medium of any of clauses 1-16, wherein the target roto-translation comprises a target position of the end effector relative to a base of the machine and a target orientation of the end effector relative to the base.

18. The non-transitory computer readable medium of any of clauses 1-17, wherein the kinematics model of the machine is based on an ideal representation of kinematic behavior of the machine.

19. The non-transitory computer readable medium of any of clauses 1-18, wherein the ideal representation of the kinematic behavior of the machine includes an ideal kinematic chain from a base of the machine to the end effector.

20. In some embodiments, a system comprises: one or more actuators that move one or more movable parts; a memory storing instructions, and one or more processors. The one or more processors execute the instructions to perform steps comprising: determining a first state for the machine based on a kinematics model of the machine and a target roto-translation for an end effector associated with the machine; determining, using a forward-kinematics machine-learning model, a difference between the target roto-translation of the end effector and a first roto-translation of the end effector when the machine is in the first state; based on the difference between the target roto-translation and the first roto-translation, determining a second state for the machine; and outputting a control input for one or more actuators that causes the machine enter into the second state.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a machine, the method comprising:

iteratively determining a proposed state for the machine, comprising:

determining a candidate state for the machine based on a kinematics model of the machine and a target roto-translation of an end effector associated with the machine;

determining, using a forward-kinematics machine-learning model, a difference between the target roto-translation of the end effector and a candidate roto-translation of the end effector when the machine is in the candidate state, wherein the difference is based on at least one of a load that is applied to an axis of the machine or an environmental factor that affects a kinematic behavior of the machine;

when the difference between the target roto-translation and the candidate roto-translation exceeds a threshold convergence value, determining a second state for the machine for evaluation as the candidate state; and when the difference between the target roto-translation and the candidate roto-translation does not exceed the threshold convergence value, selecting the candidate state as the proposed state; and outputting a control input for one or more actuators that causes the machine to enter into the proposed state.

2. The computer-implemented method of claim 1, wherein a difference between the target roto-translation of the end effector and a proposed roto-translation of the end effector when the machine is in the proposed state is less than the difference between the target roto-translation of the end effector and the candidate roto-translation.

3. The computer-implemented method of claim 1, wherein the proposed state for the machine includes a state value for each actuator associated with the machine.

4. The computer-implemented method of claim 3, wherein the state value for each actuator comprises either a rotation value or a translation value.

5. The computer-implemented method of claim 1, wherein the target roto-translation comprises a target position of the end effector relative to a base of the machine and a target orientation of the end effector relative to the base.

6. The computer-implemented method of claim 1, wherein the kinematics model of the machine is based on an ideal representation of kinematic behavior of the machine.

7. The computer-implemented method of claim 6, wherein the ideal representation of the kinematic behavior of the machine includes an ideal kinematic chain from a base of the machine to the end effector.

8. The computer-implemented method of claim 1, wherein determining the proposed state for the machine is further based on an initial state for the machine that is determined prior to determining the proposed state for the machine.

9. The computer-implemented method of claim 8, wherein determining the initial state for the machine comprises:

determining the initial state for the machine based on the kinematics model of the machine and the target roto-translation of the end effector; and determining, using the forward-kinematics machine-learning model, a difference between the target roto-translation of the end effector and an initial roto-translation of the end effector when the machine is in the initial state.

10. The computer-implemented method of claim 9, further comprising determining that the difference between the target roto-translation of the end effector and the initial roto-translation is greater than the threshold convergence value.

11. The computer-implemented method of claim 9, wherein the proposed state for the machine is further based on the difference between the target roto-translation of the end effector and the initial roto-translation.

12. One or more non-transitory computer readable media including a set of instructions that, in response to execution by one or more processors of a computer system, cause the one or more processors to control a machine by performing the steps of:

iteratively determining a proposed state for the machine, comprising:

determining a candidate state for the machine based on a kinematics model of the machine and a target roto-translation of an end effector associated with the machine;

determining, using a forward-kinematics machine-learning model, a difference between the target roto-translation of the end effector and a candidate roto-translation of the end effector when the machine is in the candidate state, wherein the difference is based on at least one of a load that is applied to an axis of the machine or an environmental factor that affects a kinematic behavior of the machine;

when the difference between the target roto-translation and the candidate roto-translation exceeds a threshold convergence value, determining a second state for the machine for evaluation as the candidate state; and when the difference between the target roto-translation and the candidate roto-translation does not exceed the threshold convergence value, selecting the candidate state as the proposed state; and outputting a control input for one or more actuators that causes the machine to enter into the proposed state.

13. The one or more non-transitory computer readable media of claim 12, wherein a difference between the target roto-translation of the end effector and a proposed roto-translation of the end effector when the machine is in the proposed state is less than the difference between the target roto-translation of the end effector and the candidate roto-translation.

14. The one or more non-transitory computer readable media of claim 12, wherein the proposed state for the machine includes a state value for each actuator associated with the machine.

15. The one or more non-transitory computer readable media of claim 14, wherein the state value for each actuator comprises either a rotation value or a translation value.

16. The one or more non-transitory computer readable media of claim 12, wherein the target roto-translation comprises a target position of the end effector relative to a base of the machine and a target orientation of the end effector relative to the base.

17. The one or more non-transitory computer readable media of claim 12, wherein the kinematics model of the machine is based on an ideal representation of kinematic behavior of the machine.

18. The one or more non-transitory computer readable media of claim 17, wherein the ideal representation of the kinematic behavior of the machine includes an ideal kinematic chain from a base of the machine to the end effector.

19. A system, comprising:

one or more actuators that move one or more movable parts;

a memory storing instructions, and one or more processors that execute the instructions to control a machine that includes the one or more actuators by performing steps comprising:

iteratively determining a proposed state for the machine, comprising:

determining a candidate state for the machine based on a kinematics model of the machine and a target roto-translation of an end effector associated with the machine;

determining, using a forward-kinematics machine-learning model, a difference between the target roto-translation of the end effector and a candidate roto-translation of the end effector when the machine is in the candidate state, wherein the difference is based on at least one of a load that is applied to an axis of the machine or an environmental factor that affects a kinematic behavior of the machine;

when the difference between the target roto-translation and the candidate roto-translation exceeds a threshold convergence value, determining a second state for the machine for evaluation as the candidate state; and when the difference between the target roto-translation and the candidate roto-translation does not exceed the threshold convergence value, selecting the candidate state as the proposed state; and outputting a control input for one or more actuators that causes the machine to enter into the proposed state.

20. The computer-implemented method of claim 1, wherein the environmental factor comprises one of an ambient temperature, an atmospheric pressure, or an atmospheric humidity.

\* \* \* \* \*